US005531652A

United States Patent [19]
Hall, III et al.

[11] Patent Number: 5,531,652
[45] Date of Patent: Jul. 2, 1996

[54] POWER TRANSMISSION

[75] Inventors: Arthur Hall, III, Cicero; Ralph L. Najmon, Danville, both of Ind.

[73] Assignee: General Motors Corporation, Detroit, Mich.

[21] Appl. No.: 385,030

[22] Filed: Feb. 7, 1995

[51] Int. Cl.$^6$ .............................. F16H 47/08; B60F 3/00
[52] U.S. Cl. .............................. 475/36; 475/53; 74/665 F; 114/270
[58] Field of Search .................... 475/36, 47, 53; 74/665, 665 G, 665 GA; 440/75, 86; 114/270

[56] References Cited

U.S. PATENT DOCUMENTS

| | | | |
|---|---|---|---|
| 2,997,896 | 8/1961 | Preston | 475/47 X |
| 3,487,802 | 1/1970 | Roy | 114/270 |
| 4,309,914 | 1/1982 | Hiersig et al. | 74/665 F X |
| 4,820,209 | 4/1989 | Newman | 440/75 X |

FOREIGN PATENT DOCUMENTS

| | | | |
|---|---|---|---|
| 3102556 | 8/1982 | Germany | 440/75 |
| 3832559 | 2/1990 | Germany | 114/270 |

*Primary Examiner*—Charles A. Marmor
*Assistant Examiner*—Nathan O. Jensen
*Attorney, Agent, or Firm*—Donald F. Scherer

[57] ABSTRACT

A power transmission for a vehicle which operates on land and in water has an engine driven torque converter, a planetary gear arrangement and a pair of output members. The water or sea-drive is connected with one output member which is connected to the planetary gear arrangement through a selectively engageable clutch. The land-drive is connected with the other output which is connected with the torque converter through a selectively engageable clutch. The torque converter turbine is connected with a member of the planetary gear arrangement and is selectively connectible with the impeller through a selectively engageable bypass or torque converter clutch.

3 Claims, 1 Drawing Sheet

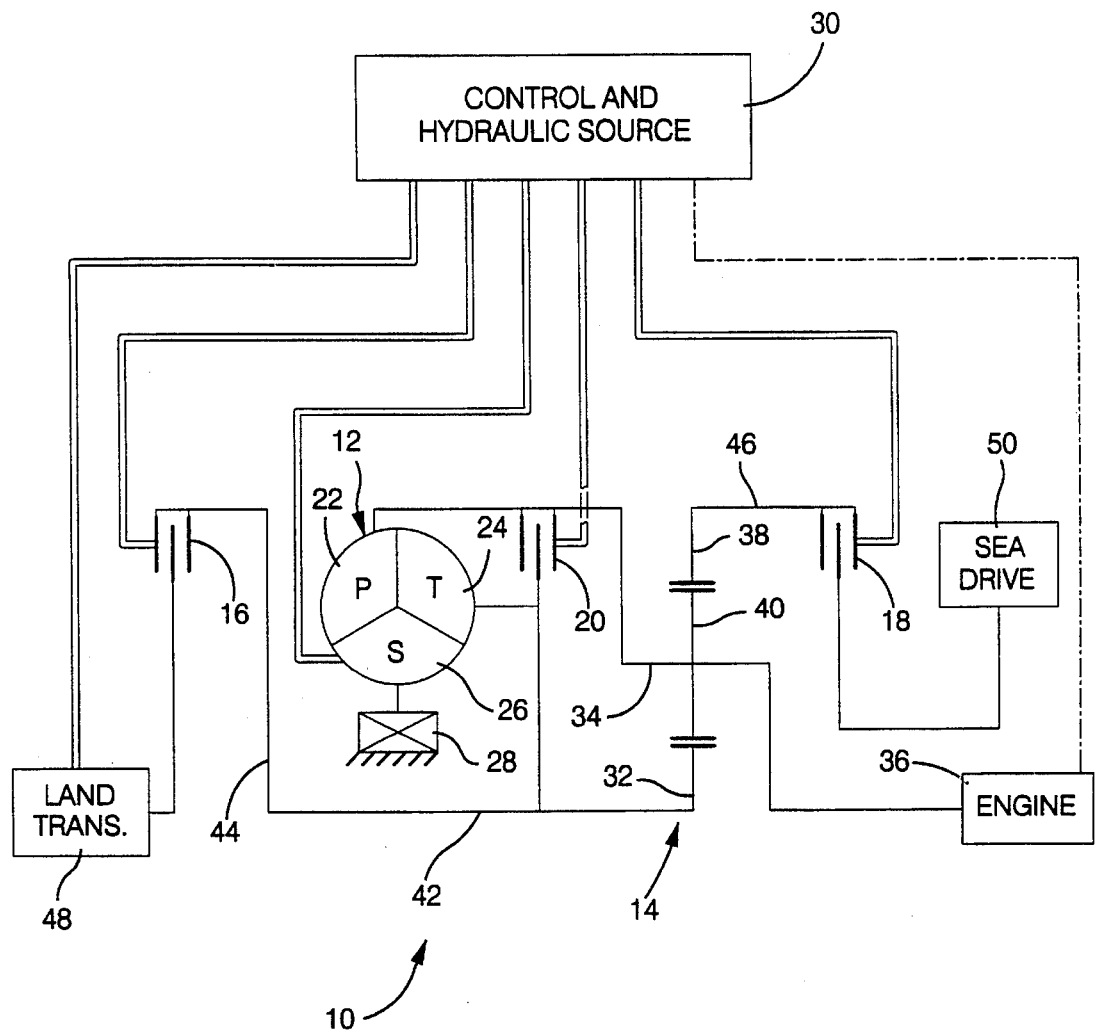

POWER TRANSMISSION

TECHNICAL FIELD

This invention relates to power transmissions, and more particularly, to power transmissions selectively providing independent and concurrent power paths for land and water operation.

BACKGROUND OF THE INVENTION

It is necessary for some vehicles to operate both on land and in water. These vehicles are generally tracked vehicles having ground laying tracks for land propulsion and screw-drives for water propulsion. The vehicles to date have utilized two separate drive systems, one for land and the other for water, which are driven by the same engine. This requires a separate land transmission including a torque converter and a separate device for dynamically engaging the engine to the sea-drive for providing a fixed ratio torque path.

The sea-drive requires a controlled engagement device, such as a fluid coupling, to permit smooth acceleration during engaging the high inertia drive system. These systems generally have some difficulty in converting from land to sea operation or vice versa. The speed of the engine is the one general road block to the interchange from land to sea-drive and vice versa. For example, if the engine is operating to drive the vehicle in water at approximately 25% of its maximum speed and the land transmission is engaged, the land transmission would also be driven at the same relative speed. Since there is not fixed relationship between the water speed and the land speed, or the speed over the sea bed, this would provide a very rough transition in the drive system from the sea-drive to the land-drive.

SUMMARY OF THE INVENTION

The present invention incorporates a torque converter between the engine and the land drive and a planetary gear set between the engine and the sea-drive. The planetary set is also connected with the torque converter, such that a fluid reaction is permitted during engagement of the sea-drive. With the present invention, during land propulsion, the power transmission provides the function of a torque converter and delivers all power to the land transmission. Thus, the operation is considerably similar to the presently used systems.

During sea-drive or water propulsion, the power transmission provides an apparatus for absorbing the shocks resulting from the engagement of the initially stationary sea propulsion system to the running engine. This shock absorbing function is accommodated by the torque converter which is utilized as the reaction member within the system during this engagement.

The system also permits dual mode operation, for example, when the vehicle is making a transition from sea to land or vice versa. The power is split between the sea and land drives as the vehicle conditions require. Again, this is accommodated by the torque converter within the system.

The present power transmission system allows for speed differential between the drive systems as the drive reactions dictate. This makes a smooth transition between the two drive conditions. The system also includes a torque converter or bypass clutch which is selectively engageable to provide a direct drive connection between the engine and the output members. For example, after the sea-drive has been engaged and the vehicle is operating under substantially stable conditions, the torque converter clutch is engaged thereby delivering the power directly to the sea-drive. During land operation, the torque converter clutch is engaged to provide a direct drive connection between the engine and the land transmission in a well known manner.

It is therefore an object of this invention to provide an improved power transmission for operation in a vehicle having both and land and sea-drive capabilities.

DESCRIPTION OF THE DRAWINGS

The drawing is a schematic representation of a power transmission incorporating the present invention.

DESCRIPTION OF AN EXEMPLARY EMBODIMENT

There is seen in the drawing a power transmission generally designated 10 having a torque converter 12, a planetary gear arrangement 14, a first fluid operated clutch 16, a second fluid operated clutch 18 and a torque converter clutch 20.

The torque converter 12 is a substantially conventional hydrodynamic power transmission device having an impeller or pump 22, a turbine 24 and a stator 26. These elements 22, 24, 26 are connected in a well known flow path during which, and under normal operating conditions, fluid power is transmitted from the pump 22 to the turbine 24 and is recirculated through the stator to provide a torque multiplication.

The stator 26 is connected to a stationary portion of the transmission through a one-way device 28, such that when the pump and impeller reach a specific speed ratio, the fluid leaving the pump will impinge on rear surfaces of the stator blades, thereby causing forward rotation which will be permitted by the one-way device 28. The operation of torque converters is well known in the art, and it is not believed that a more involved discussion is required at this point.

The turbine 24 is selectively connectible with the impeller 22 through a selectively engageable fluid operated clutch 20 which is controlled in engagement and disengagement by a conventional control and hydraulic source 30. The clutch 20 is a conventional fluid operated friction device. These devices have been utilized in torque converters for a number of years to improve the overall operating efficiency of the system such that their design and structure is well known. The control 30 also supplies hydraulic fluid to the torque converter 12 in a well known manner.

The planetary gear arrangement 14 includes a sun gear 32 drivingly connected with the turbine 24, a carrier 34 drivingly connected with an engine 36 and with the impeller 22, and a ring gear 38. The carrier 34 includes a plurality of pinion gears 40 rotatably supported thereon and meshing with the sun gear 32 and ring gear 38. The sun gear 32 is also connected via a shaft 42 and hub 44 with the clutch 16. The ring gear 38 is connected via a hub 46 with the clutch 18.

The clutch 16 is connected with a conventional land transmission 48 and the clutch 18 is connected with a conventional sea-drive 50. The land transmission 48 is preferably a multi-speed power shifting type transmission which is well known in the track laying vehicle power transmission field. The sea-drive is preferably a screw-drive which essentially ejects water to propel the vehicle through water. In the alternative, other types of sea-drive arrangements, such as propellers, might be utilized.

In any event, the sea-drive 50 is generally a high inertia member which requires considerable starting torque when initially engaged. The starting torque required by the land transmission is, of course, related to the vehicle inertia and the track engaging conditions between the vehicle and the surface on which the vehicle is to be driven.

The engine 36 is preferably a governed engine which is electronically connected with the control 30 and has operator inputs, not shown, such as a fuel control. Generally, the engine has a fuel control which will attempt to maintain a constant speed as desired by the operator. For example, the engine may operate at 800 rpm during low throttle idle conditions, and at various speeds up to a maximum speed, depending upon the throttle setting input by the operator.

The land transmission 48, clutch 16 and clutch 18 are all provided with hydraulic fluid from the control 30 to establish the operation thereof. The clutches 16 and 18 are conventional fluid operated friction devices in which a pressure operated piston is utilized to enforce frictional engagement between a plurality of interdigitated clutch plates. The land transmission 48 utilizes various clutches and brakes, as is well known, to establish a plurality of ratios between the input and output of the transmission.

During vehicle operation, the vehicle may be either in water or on land during start-up. If the vehicle is on land, the clutch 16 is engaged. The torque converter acts as an input device for the land transmission, such that the turbine will remain stationary and the pump 22 will be driven by the engine 36. This will establish some torque input to the transmission 48, and depending upon the resistance to movement, the vehicle may or may not begin to accelerate. However, as the speed of engine 36 and the fuel supplied thereto increases, the torque output of the torque converter 12 by the turbine 24 will increase thereby causing the vehicle to proceed across the land. This operation is well known in track laying vehicles.

If the vehicle is in the water, the clutch 18 is engaged and the ring gear 38 will be brought to rest due to the high inertia of the sea-drive 50. The engine 36 will generally be at idle and will maintain a constant speed at the carrier 34. This will cause the pump 22 to rotate at the same speed as the engine 36. The sun gear 32 will be driven forwardly due to the planetary action, such that the turbine 24 will rotate at a speed faster than the pump 22 and establish a converter backdrive condition, wherein the turbine is a reaction member within the system due to the backflow of fluid therein.

As the ring gear 38 is brought to rest, the sea-drive 50 will receive torque due to the reaction and will begin to rotate to drive the vehicle in the water. Typically, the system will stabilize with the turbine 24 rotating at about 125% of the speed of the pump 22. Thus, the shock of the sea-drive being engaged is absorbed by the torque converter. When the system has stabilized, the torque converter clutch 20 can be engaged thereby bringing the pump and turbine into a 1:1 drive and all the power will be directed to the sea-drive system. This will permit the torque converter clutch 20 being designed as a smaller unit than would otherwise be necessary if the total inertia of the sea-drive had to be absorbed by a frictional starting device. The sea-drive can also be maintained without the torque converter clutch being engaged by permitting the torque converter to operate as a reaction in the system. However, it is preferable during normal sea operation to engage the torque converter clutch 20.

There will occur times when the power transmission must operate in both sea and land-drive conditions simultaneously. For these conditions, both the clutches 16 and 18 are engaged and the torque converter clutch 20 is disengaged. This permits a speed differential to occur between the sea-drive 50 and the land transmission 48.

As will be apparent to those skilled in the art, the load or torque reaction on the sea-drive system is a function of system speed and the density of the media being operated in. This media can vary from 100% water to 100% air or some combination thereof as the vehicle enters or exits the water. The land-drive system load is essentially a function of the ground traction and the rolling resistance of the vehicle as seen at the vehicle tracks. Both of these loads are dynamically affected by the request for acceleration or deceleration of the vehicle as the throttle position is altered by the operator.

If the vehicle is in a transmission mode and fully afloat, it will operate essentially as it does in the sea-mode except that the torque converter clutch will not be applied. If the vehicle sea-drive system inlets are out of the water and the tracks are engaging the land, it will operate essentially as it does in the land-mode with the lockup clutch being disengaged.

If the vehicle is between these two conditions, the torque converter 12 will distribute the torque between water and land drives as the tracks engage and slip on the sea bottom and the sea-drive pumps varying mixtures of water and air.

In the transmission mode, the torque converter can operate between a stall condition where the speed of the turbine is zero, and an overrunning condition where the speed of the turbine is 1.25 times the impeller speed. As the vehicle comes on shore, the tracks begin to transmit considerably more torque to the seabed and the speed ratio in the torque converter is reduced as the torque ratio increases. This delivers increasing torque to the land system.

The sea-drive system load increases because it is pumping a higher percentage of water, the speed ratio increases as the sea-drive slows. Thus, the actual operating speed ratio of the converter is determined by the balance between the torque requirements at the land-drive and sea-drive. The torque converter provides smooth and substantially seamless transition between the two drive systems as dictated by the operating conditions.

Obviously, many modifications and variations of the present invention are possible in light of the above teaching. It is therefore to be understood, that within the scope of the appended claims, the invention may be practiced otherwise than as specifically described.

We claim:

1. A power transmission in an amphibious vehicle comprising:

an engine driven input shaft;

an input planetary gear set having a carrier assembly drivingly connected with the input shaft, a sun gear and a ring gear;

a torque converter having a pump drivingly connected with the carrier assembly and a turbine drivingly connected with the sun gear;

a land drive output;

a water drive output;

a first clutch selectively connecting the ring gear with the water drive output;

a second clutch selectively connecting the turbine and sun gear with the land drive output; and a third clutch selectively directly connecting the input shaft with the second clutch means in bypassing relation with the torque converter.

2. A power transmission in an amphibious vehicle comprising:

an engine driven input shaft;

an input planetary gear set having a first rotatable member drivingly connected with the input shaft, a second rotatable member and a third rotatable member;

a torque converter having a pump drivingly connected with the first rotatable member and a turbine drivingly connected with the second rotatable member;

a land drive output;

a water drive output;

first clutch means for selectively connecting the third rotatable member with the water drive output;

second clutch means for selectively connecting the turbine and second rotatable member with the land drive output; and third clutch means for selectively directly connecting the input shaft with the second clutch means in bypassing relation with the torque converter.

3. A power transmission in an amphibious vehicle comprising:

an engine driven input shaft;

an input planetary gear set having a carrier assembly drivingly connected with the input shaft, a sun gear and a ring gear;

a torque converter having a pump drivingly connected with the carrier assembly and a turbine drivingly connected with the sun gear;

a land drive output;

a water drive output;

first selectively engageable means for selectively connecting the ring gear with the water drive output;

second selectively engageable means for selectively connecting the turbine and sun gear with the land drive output; and means for selectively directly connecting the input shaft with the second clutch means in bypassing relation with the torque converter.

* * * * *